(12) United States Patent
Kim et al.

(10) Patent No.: US 9,841,625 B2
(45) Date of Patent: Dec. 12, 2017

(54) COLOR CONVERSION PANEL, DISPLAY DEVICE INCLUDING THE SAME, AND MANUFACTURING METHOD OF THE COLOR CONVERSION PANEL

(71) Applicant: Samsung Display Co., Ltd., Yongin-si, Gyeonggi-do (KR)

(72) Inventors: Yong Seok Kim, Seoul (KR); Ki Soo Park, Hwaseong-si (KR); Young Min Kim, Asan-si (KR); Hae Il Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/040,801

(22) Filed: Feb. 10, 2016

(65) Prior Publication Data

US 2017/0059928 A1 Mar. 2, 2017

(30) Foreign Application Priority Data

Aug. 28, 2015 (KR) .......................... 10-2015-0121946

(51) Int. Cl.
*G02F 1/1335* (2006.01)
(52) U.S. Cl.
CPC .................. *G02F 1/133514* (2013.01); *G02F 2001/133562* (2013.01); *G02F 2001/133614* (2013.01); *G02F 2202/046* (2013.01); *G02F 2202/36* (2013.01)

(58) Field of Classification Search
CPC ............. G02F 1/133514; G02F 1/1368; G02F 1/133512; G02F 2202/36; G02F 2203/05; G02F 2203/055
See application file for complete search history.

(56) References Cited

U.S. PATENT DOCUMENTS

| 2014/0321101 | A1* | 10/2014 | Kadowaki | ............. G02F 1/1336 362/84 |
| 2015/0131029 | A1* | 5/2015 | Kaida | ............... G02F 1/133617 349/69 |
| 2016/0372528 | A1* | 12/2016 | Kamura | ............... H01L 27/3246 |

FOREIGN PATENT DOCUMENTS

| KR | 10-2006-0125347 A | 12/2006 |
| KR | 10-2009-0033891 A | 4/2009 |
| KR | 10-2010-0089606 A | 8/2010 |

* cited by examiner

*Primary Examiner* — Michael Caley
*Assistant Examiner* — Mariam Qureshi
(74) *Attorney, Agent, or Firm* — Lewis Roca Rothgerber Christie LLP

(57) ABSTRACT

A color conversion panel according to an exemplary embodiment of the present invention includes an insulation substrate, a plurality of color conversion media layers on the insulation substrate and configured to emit different lights, and a light blocking member between adjacent ones of the color conversion media layers, wherein a cross-section of one of the color conversion media layers is inversely tapered when compared to a cross section of another one of the color conversion media layers.

18 Claims, 9 Drawing Sheets

COLOR CONVERSION PANEL, DISPLAY DEVICE INCLUDING THE SAME, AND MANUFACTURING METHOD OF THE COLOR CONVERSION PANEL

CROSS-REFERENCE TO RELATED APPLICATION

This application claims priority to, and the benefit of, Korean Patent Application No. 10-2015-0121946, filed in the Korean Intellectual Property Office on Aug. 28, 2015, the entire contents of which are incorporated herein by reference.

BACKGROUND

1. Field

Embodiments of the present invention relate to a color conversion panel, a display device including the same, and a manufacturing method of a color conversion panel.

2. Description of the Related Art

A liquid crystal display is currently one of the most widely used flat panel displays, and includes two display panels on which electrodes are located, and a liquid crystal layer interposed therebetween, and controls the intensity of transmitted light by applying a voltage to the electrodes to rearrange liquid crystal molecules of the liquid crystal layer.

Among the liquid crystal displays, the liquid crystal display that is commonly used is a structure in which field generating electrodes are provided in two display panels. Among such structures, the mainstream structure is one where a plurality of thin film transistors and pixel electrodes are arranged in a matrix form in one display panel (hereinafter referred to as a "thin film transistor array panel"), color filters of red, green, and blue are disposed in the other display panel (hereinafter referred to as a "common electrode panel"), which includes a common electrode that covers an entire surface thereof.

However, in the liquid crystal display, light loss occurs in a polarizer and in a color filter. To reduce light loss, and to implement the high efficiency liquid crystal display, a PL-liquid crystal display (Photo-Luminescent LCD) including a color conversion material has been proposed.

The above information disclosed in this Background section is only for enhancement of understanding of the background of the invention, and therefore it may contain information that does not form the prior art.

SUMMARY

Embodiments of the present invention provide a display device with improved display quality by preventing a color mixing of a color conversion panel, and a manufacturing method of a color conversion panel with reduced cost and time by simplifying a manufacturing process.

A color conversion panel according to an exemplary embodiment of the present invention includes an insulation substrate, a plurality of color conversion media layers on the insulation substrate and configured to emit different lights, and a light blocking member between adjacent ones of the color conversion media layers, wherein a cross-section of one of the color conversion media layers is inversely tapered when compared to a cross section of another one of the color conversion media layers.

The color conversion media layer may include a negative photosensitive resin, and the inversely tapered color conversion media layer may be soluble.

The plurality of color conversion media layers may include a first color conversion media layer, a second color conversion media layer, and a third color conversion media layer, the first color conversion media layer and the second color conversion media layer may include a quantum dot or a phosphor, and the third color conversion media layer might not include a quantum dot or a phosphor.

The plurality of color conversion media layers may include a first color conversion media layer and a second color conversion media layer, and the color conversion panel may further include a blue light cutting filter on the insulation substrate and overlapping the first color conversion media layer and the second color conversion media layer, the blue light cutting filter being continuously formed.

The color conversion panel may further include a band-pass filter on the first color conversion media layer and on the second color conversion media layer.

The color conversion panel may further include an assistance metal layer between adjacent ones of the color conversion media layers.

The light blocking member may overlap the assistance metal layer, the band-pass filter, or the blue light cutting filter.

A display device according to an exemplary embodiment of the present invention includes a display panel, and a color conversion panel on the display panel and including an insulation substrate, a plurality of color conversion media layers on the insulation substrate, facing the display panel, and configured to emit different lights, and a light blocking member between adjacent ones of color conversion media layers, wherein a cross-section of one of the color conversion media layers is inversely tapered when compared to a cross-section of another one of the color conversion media layers.

The color conversion media layer may include a negative photosensitive resin, and the inversely tapered color conversion media layer may be soluble.

The plurality of color conversion media layers may include a first color conversion media layer, a second color conversion media layer, and a third color conversion media layer, the first color conversion media layer and the second color conversion media layer may include a quantum dot or a phosphor, and the third color conversion media layer might not include, a quantum dot or a phosphor.

A display device according to an exemplary embodiment of the present invention includes a thin film transistor array panel, a color conversion panel facing the thin film transistor array panel, and a liquid crystal layer including liquid crystal molecules between the thin film transistor array panel and the color conversion panel, wherein the color conversion panel includes an insulation substrate, a plurality of color conversion media layers on the insulation substrate, facing the thin film transistor array panel, and configured to emit lights of different colors, and a light blocking member between adjacent ones of the color conversion media layers, and wherein a cross-section of one of the color conversion media layers is inversely tapered when compared to a cross-section of another one of the color conversion media layers.

The color conversion media layer may include a negative photosensitive resin, and the inversely tapered color conversion media layer may be soluble.

The plurality of color conversion media layers may include a first color conversion media layer, a second color conversion media layer, and a third color conversion media layer, the first color conversion media layer and the second color conversion media layer may include a quantum dot or a phosphor, and the third color conversion media layer might not include a quantum dot or a phosphor.

A manufacturing method of a color conversion panel according to an exemplary embodiment of the present invention includes forming a first color conversion media layer on an insulation substrate, forming a second color conversion media layer on the insulation substrate, forming a light blocking member on the first color conversion media layer or the second color conversion media layer, the light blocking member defining an opening, coating a color conversion resin on the light blocking member, and ashing the color conversion resin to form a third color conversion media layer in the opening.

The color conversion resin may include a negative photosensitive resin, wherein the first color conversion media layer and the second color conversion media layer are insoluble, and the third color conversion media layer may be soluble.

The method may further include forming a blue light cutting material layer on the insulation substrate, forming a band-pass material layer on the first color conversion media layer and on the second color conversion media layer, and forming a metal material layer on the band-pass material layer.

The method may further include etching the blue light cutting material layer, the band-pass material layer, or the metal material layer by using the light blocking member as a mask to form a blue light cutting filter, a band-pass filter, or an assistance metal layer.

The forming of the light blocking member may include coating a light blocking photosensitive resin on the first color conversion media layer and on the second color conversion media layer, patterning the coated light blocking photosensitive resin, and ashing the patterned light blocking photosensitive resin.

According to the manufacturing method of the color conversion panel, the manufacturing process is simplified such that the cost and the time may be reduced, according to the color conversion panel and the display device including the same, the color mixing of the color conversion panel is prevented, thereby providing the improved display quality.

DETAILED DESCRIPTION

Figure 1:
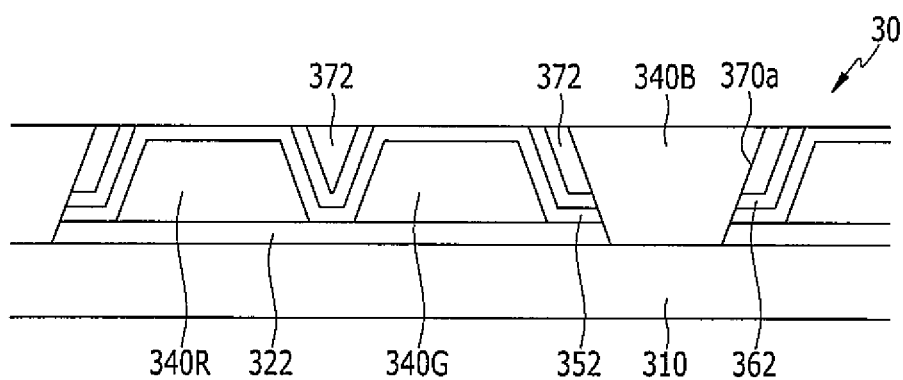
FIG. 1 is a cross-sectional view of a color conversion panel according to an exemplary embodiment of the present invention.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit, and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
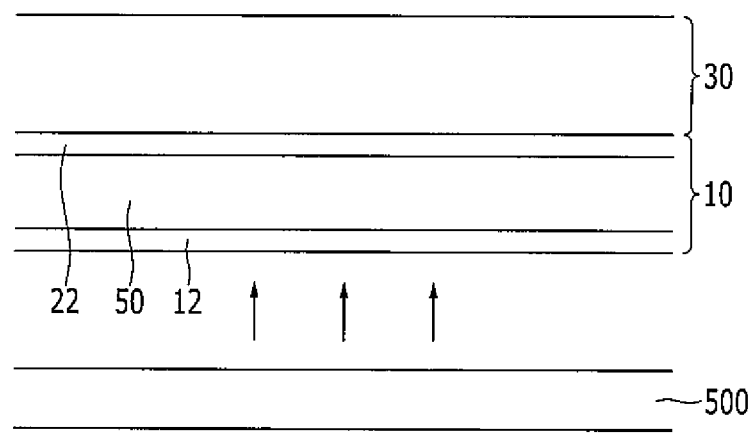
FIG. 2 is a schematic cross-sectional view of a display device according to an exemplary embodiment of the present invention.
Figure 3:
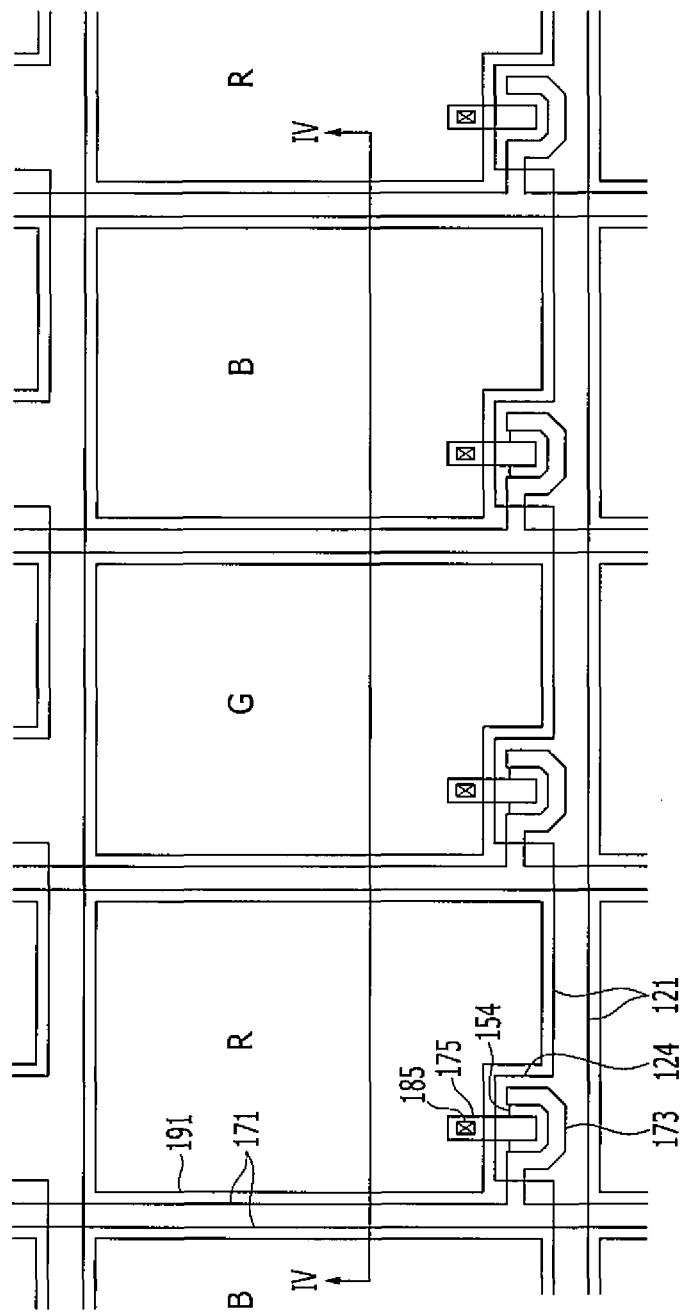
FIG. 3 is a top plan view of a plurality of adjacent pixels in a display device according to an exemplary embodiment of the present invention.
Figure 4:
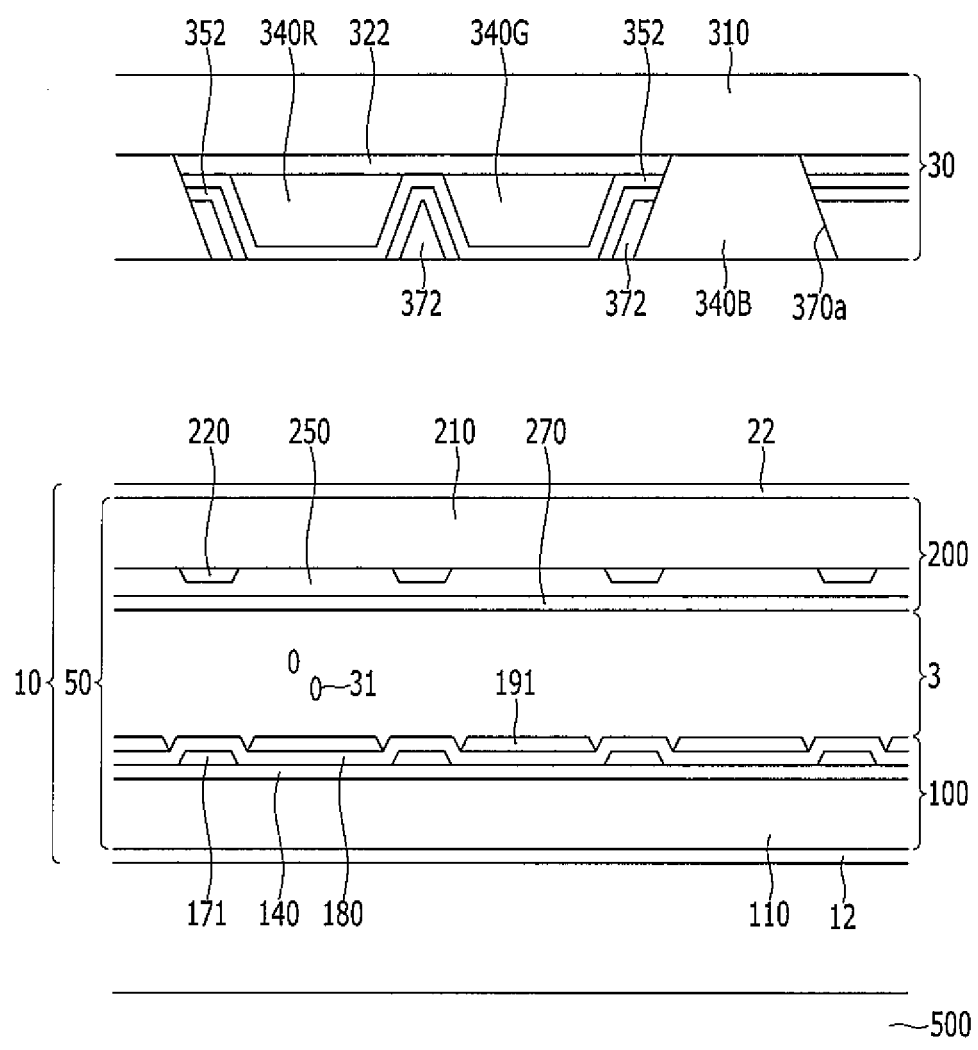
FIG. 4 is a cross-sectional view taken along the line IV-IV of FIG. 3.

Next, a color conversion panel, and a display device including the same, according to an exemplary embodiment of the present invention, will be described with reference to FIGS. 1-4. FIG. 1 is a cross-sectional view of a color conversion panel, according to an exemplary embodiment of the present invention, FIG. 2 is a schematic cross-sectional view of a display device according to an exemplary embodiment of the present invention, FIG. 3 is a top plan view of a plurality of adjacent pixels in a display device according to an exemplary embodiment of the present invention, and FIG. 4 is a cross-sectional view taken along the line IV-IV of FIG. 3.

First, as shown in FIG. 1, a color conversion panel 30 includes a blue light cutting filter 322 on an insulation substrate 310. The blue light cutting filter 322 may overlap a first color conversion media layer 340R and a second color conversion media layer 340G.

According to an exemplary embodiment of the present invention, blue light cutting filters 322 overlapping the first color conversion media layer 340R and the second color conversion media layer 340G may be connected to each other. That is, the blue light cutting filter 322 may also overlap a light blocking member 372 between the first color conversion media layer 340R and the second color conversion media layer 340G.

The blue light cutting filter 322 may be formed by mixing one material among $BiO_2$, $ZnO$, and $Ce_2O_3$ and one material among $CaCO_3$, $ZrO_2$, $TiO$, and $Ar_2O_3$, however it is not limited thereto, and any material to block blue light may be used.

The blue light cutting filter 322 absorbs light of a wavelength band of about 400 nm to about 500 nm such that only blue light having this wavelength band is blocked. In this case, transmittance of the blue light cutting filter 322 is less than about 5% for a wavelength of about 450 nm, more than about 80% for a wavelength about 535 nm, and more than about 90% for a wavelength of about 650 nm.

That is, the blue light cutting filter 322 prevents color mixing from being generated in the process in which the blue light emitted from a light assembly 500 (see FIG. 2) is realized as red (R) and green (G) colors through the first color conversion media layer 340R and the second color conversion media layer 340G, respectively.

Next, a plurality of color conversion media layers 340R, 340G, and 340B are formed on the insulation substrate 310, or formed on the insulation substrate 310 and the blue light cutting filter 322.

The first color conversion media layer 340R may convert the blue light supplied from the light assembly 500 shown in FIG. 2 into red. For this, the first color conversion media layer 340R may include a red phosphor, and the red phosphor may be at least one material among (Ca, Sr, Ba)S, $(Ca, Sr, Ba)_2Si_5N_8$, CASN ($CaAlSiN_3$), $CaMoO_4$, and $Eu_2Si_5N_8$.

The second color conversion media layer 340G may convert the blue light supplied from the light assembly 500 shown in FIG. 2 into green. The second color conversion media layer 340G may include a green phosphor, and the green phosphor may be at least one material of yttrium aluminum garnet (YAG), $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON, and $(Sr_{1-x}Ba_x)Si_2O_2N_2$. In this case, x may be a number between 0 and 1.

Also, the first color conversion media layer 340R and the second color conversion media layer 340G may include a quantum dot for converting the color. The quantum dot may be selected from a Group II-VI compound, a Group III-V compound, a Group IV-VI compound, a Group IV element, a Group IV compound, and/or a combination thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and/or a mixture thereof; a tertiary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and/or a mixture thereof; and a quarternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and/or a mixture thereof. The Group IV-VI compound may be selected from the group consisting of a binary compound selected from the group consisting of GaN, GaP, GaAs, GaSb, AlN, AlP, AlAs, AlSb, InN, InP, InAs, InSb, and/or a mixture thereof; a tertiary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and/or a mixture thereof; and a quarternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and/or a mixture thereof. The Group IV compound may be selected from the group consisting of a binary compound selected from the group consisting of SnS, SnSe, SnTe, PbS, PbSe, PbTe, and/or a mixture thereof; a tertiary compound selected from the group consisting of SnSeS, SnSeTe, SnSTe, PbSeS, PbSeTe, PbSTe, SnPbS, SnPbSe, SnPbTe, and/or a mixture thereof; and a quaternary compound selected from the group consisting of SnPbSSe, SnPbSeTe, SnPbSTe, and/or a mixture thereof. The group IV element may be selected from the group consisting of Si, Ge, and/or a mixture thereof. The group IV compound may be a binary compound selected from the group consisting of SiC, SiGe, and/or a mixture thereof.

In this case, the binary compound, the tertiary compound, or the quaternary compound may exist in particles at a uniform concentration, or may exist in the same particle divided into states where concentration distributions are partially different. Further, the color conversion media layer may have a core/shell structure where one quantum dot surrounds another quantum dot. An interface between the core and the shell may have a concentration gradient, such that a concentration of an element existing in the shell is gradually reduced toward the center thereof.

The quantum dot may have a full width at half maximum (FWHM) of an emission wavelength spectrum of about 45 nm or less, or about 40 nm or less, or about 30 nm or less. In this range, color purity or color reproducibility may be improved. Also, the light emitted through the quantum dot is irradiated in all directions, thereby improving a light viewing angle.

Further, a form of the quantum dot may be a form that is generally used in the art and is not particularly limited, but more specifically, forms such as spherical, pyramidal, multi-arm-shaped, or cubic nanoparticles, nanotubes, nanowires, nanofibers, and nanoplate-shaped particles may be used.

The first color conversion media layer 340R and the second color conversion media layer 340G may be formed by exposing and developing a negative photosensitive resin, and a cross-section of the first color conversion media layer 340R and the second color conversion media layer 340G may have a tapered shape. The first color conversion media layer 340R and the second color conversion media layer 340G are insoluble.

The third color conversion media layer 340B is made of a transparent polymer, and the blue light supplied from the light assembly 500 is transmitted to represent the blue. The third color conversion media layer 340B corresponding to the region emitting the blue includes a material emitting the incident blue with the separate phosphor or quantum dot (as one example, a polymer such as a photosensitive resin, $TiO_2$).

In this case, the cross-section of the third color conversion media layer 340B may be inversely tapered (e.g., tapered in a direction that is opposite to the taper direction of the first color conversion media layer 340R and the second color conversion media layer 340G). Here, that the cross-section is inversely tapered indicates that the upper cross-section may be formed to be wider than the lower cross-section, as shown in FIG. 1. This is because the light blocking member 372 includes an opening 370a having a tapered cross-section, and the third color conversion media layer 340B is filled in the opening 370a in the manufacturing process.

Also, the third color conversion media layer 340B may be formed by ashing a color conversion resin from the top side with a separate mask and photolithography process, such that the top surface of the third color conversion media layer 340B may be slightly concave.

The third color conversion media layer 340B may be soluble. The third color conversion media layer 340B may be formed by using the color conversion resin of the negative photosensitive resin without separate exposure and developing. That is, the color conversion resin does not include a boding forming from the exposure.

Next, a band-pass filter 352 is located on the first color conversion media layer 340R, on the second color conversion media layer 340G, and on the blue light cutting filter 322. The band-pass filter 352 and the blue light cutting filter 322 may be formed through the same process, and the flat shape thereof may be the same.

The band-pass filter 352 overlaps the first color conversion media layer 340R and the second color conversion media layer 340G, and overlaps the blue light cutting filter 322 at a region(s) not overlapping the first color conversion media layer 340R or the second color conversion media layer 340G.

The band-pass filter 352 may more effectively supply the light incident from the light assembly 500, and may be omitted in other embodiments.

Next, an assistance metal layer 362 is located on the band-pass filter 352 and located between the adjacent color conversion media layers 340R, 304G, and 340B.

The assistance metal layer 362 may be a metal material for reflecting the light, and again reflects the light that is emitted in the direction of the assistance metal layer 362 to the direction of a respective one of the color conversion media layers 340R, 340G, and 340B, thereby increasing the light amount emitted to the user.

Next, the light blocking member 372 is located on the band-pass filter 352 between the plurality of color conversion media layers 340R, 340G, and 340B.

Referring to FIG. 1, the light blocking member 372 defines the regions where the first color conversion media layer 340R, the second color conversion media layer 340G, and the third color conversion media layer 340B are located, and the first color conversion media layer 340R, the second color conversion media layer 340G, and the third color conversion media layer 340B are located between the light blocking member (e.g., between respective light blocking members) 372. In this case, the light blocking member 372 includes the opening 370a, and the color conversion resin coated at the opening 370a forms the third color conversion media layer 340B.

The light blocking member 372 may be formed by exposing and developing the negative light blocking photosensitive resin. The light blocking member 372 formed by using the exposed light blocking photosensitive resin is insoluble.

The above-described color conversion panel 30 has one almost flat surface. Accordingly, the light blocking member 372 has almost the same height as the adjacent color conversion media layers 340R, 304G, and 340B, thereby more effectively preventing color mixing between the adjacent color conversion media layers.

Next, the display device according to an exemplary embodiment of the present invention will be described with reference to FIG. 2, wherein the display device according to an exemplary embodiment of the present invention includes the color conversion panel 30, a display panel 10, and the light assembly 500. The color conversion panel 30 in the display device according to the exemplary embodiment is the same as the above-described color conversion panel 30 such that the description thereof is omitted.

The display panel 10 at the rear surface of the color conversion panel 30 may include a liquid crystal panel 50 for displaying an image, and polarizers 12 and 22 at respective surfaces of the liquid crystal panel 50.

The first polarizer 12 and the second polarizer 22 for polarization of the light incident from the light assembly 500 are at respective surfaces of the liquid crystal panel 50. The first polarizer 12 may face the light assembly 500, and the second polarizer 22 may face or may contact the color conversion panel 30.

The light assembly 500 includes a light source at the rear surface of the first polarizer 12 for generating the light, and a light guide for receiving the light and guiding the received light in the direction of the display panel 10 and the color conversion panel 30.

As one example, the light assembly 500 may include at least one light emitting diode (LED), which may be a blue light emitting diode (LED), for example. The light source according to the present invention may be an edge-type light assembly located on at least one side of the light guide plate, or may be a direct-type, where the light source of the light assembly 500 is at a directly lower portion of the light guide plate. However, the light source is not limited thereto.

Next, the above-described display panel 10 will be described in detail with reference to FIG. 3 and FIG. 4. The color conversion panel 30 and the light assembly 500 are the same as the above-described constituent elements, such that the description thereof is omitted.

First, the liquid crystal panel 50 disposed at the rear surface of the color conversion panel 30 includes a lower panel 100 including a thin film transistor to display the image, an upper panel 200 facing the lower panel 100 and including a second insulation substrate 210, and a liquid crystal layer 3 interposed between the lower panel 100 and the upper panel 200.

The polarizers 12 and 22 are disposed at respective surfaces of the liquid crystal panel 50, and the polarizer 12 may be at least one of a coating-type polarizer and a wire grid polarizer. The polarizer 12 may be disposed at one surface of the lower panel 100 by various methods such as a film method, a coating method, an adhering method, and the like. However, this description is one example, and the present invention is not limited thereto.

A plurality of pixel electrodes are arranged in a matrix shape on a first insulation substrate 110 included in the lower panel 100.

On the first insulation substrate 110, there are a gate line 121 extending in a row direction and including a gate electrode 124, a gate insulating layer 140 on the gate line 121, a semiconductor layer 154 on the gate insulating layer 140, a data line 171 on the semiconductor layer 154, extending in a column direction, and including a source electrode 173, a drain electrode 175, a passivation layer 180 on the data line 171 and the drain electrode 175, and a pixel electrode 191 electrically and physically connected to the drain electrode 175 through a contact hole 185.

The semiconductor layer 154 on the gate electrode 124 forms a channel layer in the region that is exposed by the source electrode 173 and the drain electrode 175, and the gate electrode 124, the semiconductor layer 154, the source electrode 173, and the drain electrode 175 form one thin film transistor.

Next, a light blocking member 220 is disposed on a surface of the second insulation substrate 210 that faces and is separated from the first insulation substrate 110. A planarization layer 250 providing a flat surface may be disposed on a surface of the light blocking member(s) 220 facing the first insulation substrate 110, and a common electrode 270 is located on a surface of the planarization layer 250 facing the first insulation substrate 110. The planarization layer 250 may be omitted in other embodiments.

A common electrode 270 receiving a common voltage forms an electric field with the pixel electrode 191, and arranges liquid crystal molecules 31 in the liquid crystal layer 3. The common electrode 270 may alternatively be formed in the lower panel 100.

The liquid crystal layer 3 includes a plurality of liquid crystal molecules 31, and the arrangement direction of the liquid crystal molecules 31 is controlled by the electric field between the pixel electrode 191 and the common electrode 270. According to the arrangement of the liquid crystal molecules 31, transmittance of light received from a light assembly 500 may be controlled to display an image.

The present specification describes a liquid crystal display panel where a liquid crystal panel forms a vertical electric field, although the invention is not limited thereto, and the liquid crystal display panel may be a display device, such as a plasma display panel (PDP), an organic light emitting diode display (OLED), a surface conduction electron-emitter display (SED), a field emission display (FED), a vacuum fluorescent display (VFD), and an E-paper.

The display device according to an exemplary embodiment of the present invention is improved in terms of emission ratio and color reproducibility through the color conversion panel disposed on the display panel, thereby providing excellent display quality.

Figure 5:
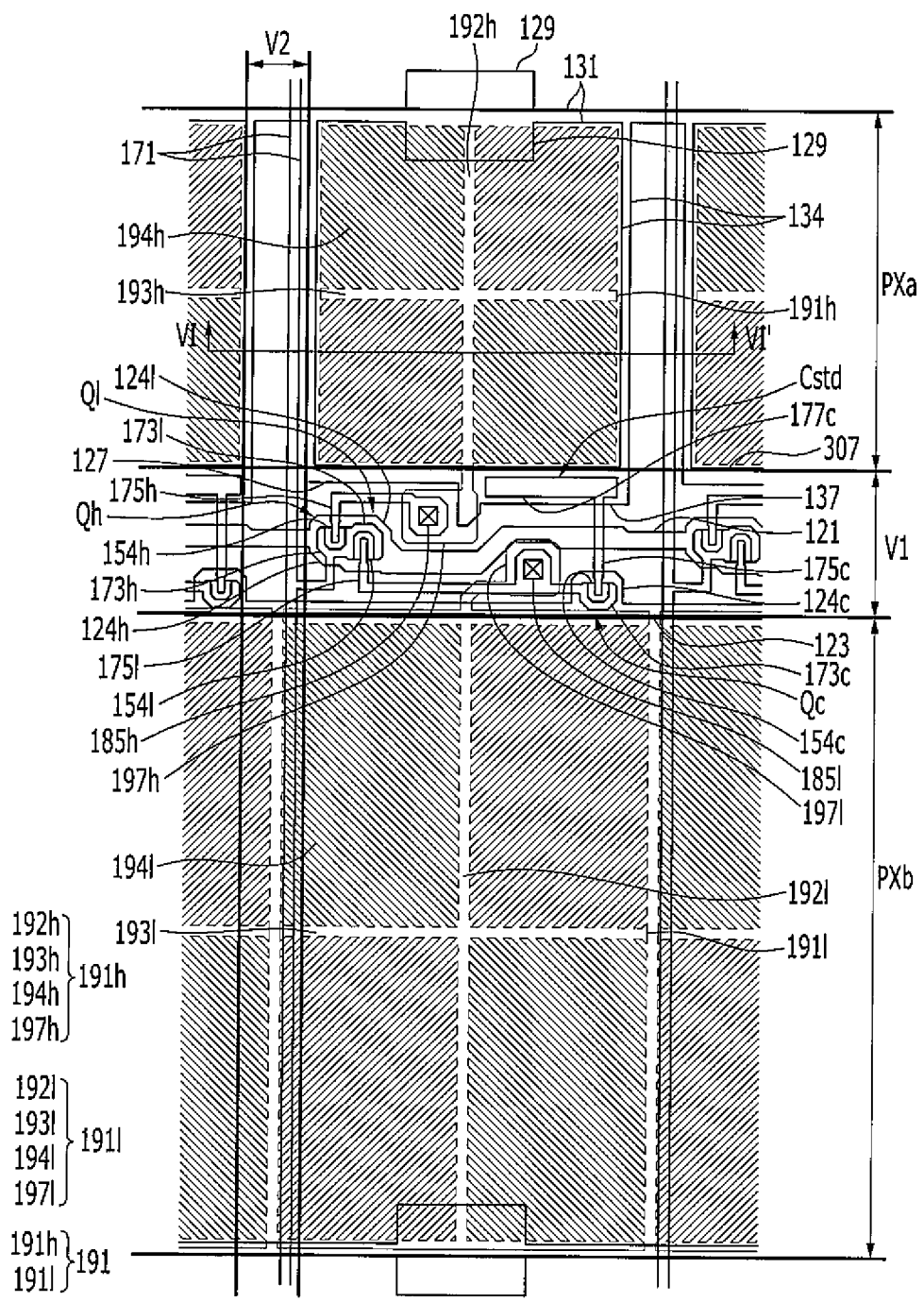
FIG. 5 is a plane layout view of a plurality of adjacent pixels in a display device according to an exemplary embodiment of the present invention.
Figure 6:
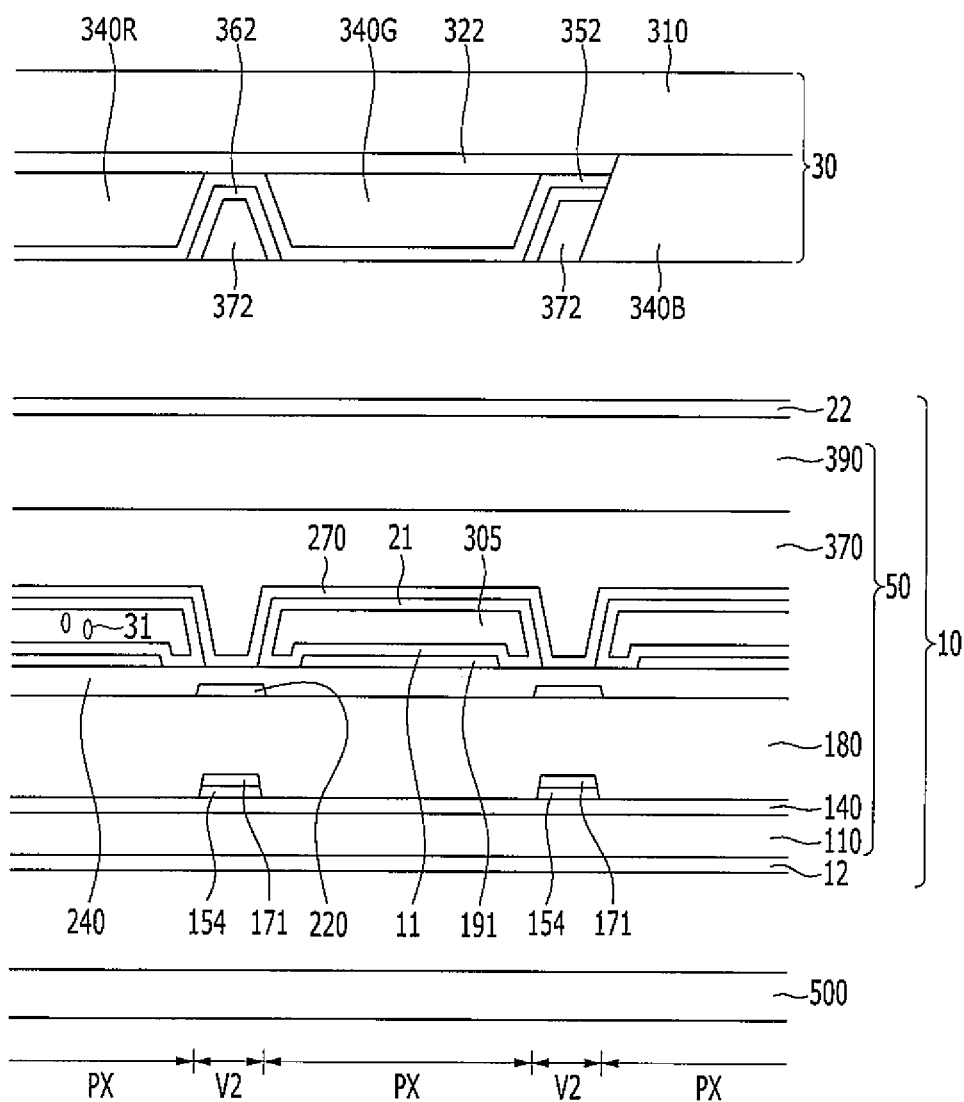
FIG. 6 is a cross-sectional view taken along the line VI-VI' of FIG. 5.

Next, the display device according to an exemplary embodiment of the present invention will be described with reference to FIG. 5 and FIG. 6. FIG. 5 is a plane layout view of a plurality of adjacent pixels in a display device according to an exemplary embodiment of the present invention, and FIG. 6 is a cross-sectional view taken along the line VI-VI' of FIG. 5. The description for the same or similar constituent elements as the display device described in FIG. 1 to FIG. 4 may be omitted hereafter.

The display device according to an exemplary embodiment of the present invention includes the display panel 10, the color conversion panel 30, and the light assembly 500.

The display panel 10 may be on the light assembly 500, and the color conversion panel 30 may be disposed on the display panel 10, although the present invention is not limited thereto, and the up/down position may be changed depending on the exemplary embodiment of the present invention.

The color conversion panel 30 and the light assembly 500 included in the display device according to an exemplary embodiment of the present invention is the same as the above-described exemplary embodiment, such that repeated detailed description thereof is omitted.

First, the display panel 10 according to an exemplary embodiment of the present invention includes the liquid crystal panel 50 and the polarizers 12 and 22 at respective surfaces of the liquid crystal panel 50. In this case, the polarizer 12 may be at least one of the coating-type polarizer and the wire grid polarizer, and the polarizers 12 and 22 may be disposed at respective surface of the liquid crystal panel 50 by various methods, such as the film method, the coating method, and/or the adhering method. However, this description is one example, and the present invention is not limited thereto.

The liquid crystal panel 50 includes a plurality of gate conductors including a plurality of gate lines 121, a plurality of step-down gate lines 123, and a plurality of storage electrode lines 131 disposed on the insulation substrate 110.

The gate lines 121 and the step-down gate lines 123 transfer gate signals and mainly extend in a transverse direction. The gate conductor further includes a first gate electrode 124h and a second gate electrode 124l respectively protruding, or extending, upward and downward from the gate line 121, and further includes a third gate electrode 124c protruding, or extending, upward from the step-down gate line 123. The first gate electrode 124h and the second gate electrode 124l are connected with each other to form one protrusion. In this case, the protrusion form of the first, second, and third gate electrodes 124h, 124l, and 124c may be modified.

The storage electrode line 131 mainly extends in a horizontal direction, and transfers a voltage, such as a common voltage Vcom. The storage electrode line 131 includes storage electrodes 129 protruding, or extending, upward and downward, a pair of vertical portions 134 extending downward to be substantially perpendicular to the gate line 121, and a horizontal portion 127 connecting ends of the pair of vertical portions 134. The horizontal portion 127 includes a capacitor electrode 137 expanded downward.

A gate insulating layer 140 is formed on the gate conductors 121, 123, 124h, 124l, 124c, and 131. The gate insulating layer 140 may be made of an inorganic insulating material, such as a silicon nitride (SiNx) and a silicon oxide (SiOx). Further, the gate insulating layer 140 may be formed as a single layer or as a multiple layer.

A first semiconductor 154h, a second semiconductor 154l, and a third semiconductor 154c are formed on the gate insulating layer 140. The first semiconductor 154h may be on the first gate electrode 124h, the second semiconductor 154l may be on the second gate electrode 124l, and the third semiconductor 154c may be on the third gate electrode 124c. The first semiconductor 154h and the second semiconductor 154l may be connected to each other, and the second semiconductor 154l and the third semiconductor 154c may also be connected to each other. In this case, the first semiconductor 154h may be extended to the lower portion of the data line 171. The first to third semiconductors 154h, 154l, and 154c may be made of amorphous silicon, polycrystalline silicon, a metal oxide, and the like.

An ohmic contact may be further formed on each of the first to third semiconductors 154h, 154l, and 154c. The ohmic contact may be made of silicide or a material, such as n+ hydrogenated amorphous silicon in which n-type impurity is doped at a high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate line 121 and the step-down gate line 123. Each data line 171 extends toward the first gate electrode 124h and the second gate electrode 124l, and includes the first source electrode 173h and the second source electrode 173l which are connected with each other.

Each of the first drain electrode 175h, the second drain electrode 175l, and the third drain electrode 175c includes one wide end portion and the other rod-shaped end portion. The rod-shaped end portions of the first drain electrode 175h and the second drain electrode 175l are partially surrounded by the first source electrode 173h and the second source electrode 173l, respectively. One wide end portion of the second drain electrode 175l is again extended to form the third source electrode 173c, which is bent in a 'U'-lettered shape. A wide end portion 177c of the third drain electrode 175c overlaps with the capacitor electrode 137 to form a step-down capacitor Cstd, and the rod-shaped end portion is partially surrounded by the third source electrode 173c.

The first gate electrode 124h, the first source electrode 173h, and the first drain electrode 175h form a first thin film transistor Qh together with the first semiconductor 154h. The second gate electrode 124l, the second source electrode 173l, and the second drain electrode 175l form a second thin film transistor Ql together with the second semiconductor 154l. The third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to be formed in a linear shape, and may have substantially the same planar shape as the data conductors 171, 173h, 173l, 173c, 175h, 175l, and 175c, and the ohmic contacts therebelow, except for respective channel regions between the source electrodes 173h, 173l, and 173c, and the drain electrodes 175h, 175l, and 175c.

In the first semiconductor 154h, an exposed portion that is not covered by the first source electrode 173h and the first drain electrode 175h is located between the first source electrode 173h and the first drain electrode 175h. In the second semiconductor 154l, an exposed portion that is not covered by the second source electrode 173l and the second drain electrode 175l is located between the second source electrode 173l and the second drain electrode 175l. In addition, in the third semiconductor 154c, an exposed portion that is not covered by the third source electrode 173c and the third drain electrode 175c is located between the third source electrode 173c and the third drain electrode 175c.

A passivation layer 180 is formed on the data conductors 171, 173h, 173l, 173c, 175h, 175l, and 175c, and the semiconductors 154h, 154l, and 154c exposed between the respective source electrodes 173h/173l/173c and the respective drain electrodes 175h/175l/175c. The passivation layer 180 may be made of an organic insulating material or of an inorganic insulating material, and may be formed as a single layer or as a multiple layer.

A light blocking member 220 is on the passivation layer 180. The light blocking member 220 is formed on a boundary of the pixel area PX and the thin film transistor to prevent light leakage.

A first insulating layer 240 may be disposed on the light blocking member 220. The first insulating layer 240 may be made of an inorganic insulating material such as a silicon nitride (SiNx), a silicon oxide (SiOx), and a silicon oxynitride (SiOxNy). The first insulating layer 240 serves to protect the light blocking member 220 made of the organic material, and may be omitted if necessary.

The first insulating layer 240, the light blocking member 220, and the passivation layer 180 have a plurality of first contact holes 185h and a plurality of second contact hole 185l respectively exposing the wide end of the first drain electrode 175h and the wide end of the second drain electrode 175l.

A pixel electrode 191 is formed on the first insulating layer 240. The pixel electrode 191 may be made of a transparent metal material, such as indium tin oxide (ITO) and indium zinc oxide (IZO).

The pixel electrode 191 includes a first subpixel electrode 191h and a second subpixel electrode 191l, which are separated from each other with the gate line 121 and the step-down gate line 123 therebetween, and are disposed above and below the pixel area PX based on the gate line 121 and the step-down gate line 123 to be adjacent each other in a column direction. That is, the first subpixel electrode 191h and the second subpixel electrode 191l are separated from each other with the first valley V1 therebetween, the first subpixel electrode 191h is at the first subpixel area PXa, and the second subpixel electrode 191l is at the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l, respectively.

An overall shape of each of the first subpixel electrode 191h and the second subpixel electrode 191l is a quadrangle, and the first subpixel electrode 191h and the second subpixel electrode 191l include cross stems including horizontal stems 193h and 193l, and vertical stems 192h and 192l crossing the horizontal stems 193h and 193l, respectively. Further, the first subpixel electrode 191h and the second subpixel electrode 191l include a plurality of minute branches 194h and 194l, and protrusions 197h and 197l protruding downward or upward from edge sides of the subpixel electrodes 191h and 191l, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, directions in which the minute branches 194h and 194l of two adjacent subregions extend may be perpendicular to each other.

The arrangement of the pixel area, the structure of the thin film transistor, and the shape of the pixel electrode that are described above are only examples, and the present invention is not limited thereto, but may be variously modified. Also, the above-described protection layer and insulating layer are not limited thereto, and may be added or omitted.

The common electrode 270 is formed on the pixel electrode 191 to be spaced from the pixel electrode 191 at a distance. A microcavity 305 is formed between the pixel electrode 191 and the common electrode 270. That is, the microcavity 305 is surrounded by the pixel electrode 191 and the common electrode 270. A width and an area of the microcavity 305 may be variously modified according to a size and a resolution of the display device.

The common electrode 270 may be made of a transparent metal material such as indium tin oxide (ITO) or indium zinc oxide (IZO). A predetermined voltage may be applied to the common electrode 270, and an electric field may be generated between the pixel electrode 191 and the common electrode 270.

A first alignment layer 11 is formed on the pixel electrode 191. A second alignment layer 21 is located below the common electrode 270 to so as face the first alignment layer 11.

The first alignment layer 11 and the second alignment layer 21 may be formed by vertical alignment layers, and may be made of alignment materials such as polyamic acid, polysiloxane, and polyimide. The first and second alignment layers 11 and 21 may be connected to each other at the edge of the pixel PX.

A liquid crystal layer, which is formed of liquid crystal molecules 31, is formed in the microcavity 305, which is disposed between the pixel electrode 191 and the common electrode 270. The liquid crystal molecules 31 have negative dielectric anisotropy, and when no electric field is applied, may be aligned in a direction perpendicular to the substrate 110. That is, vertical orientation may be generated.

The first subpixel electrode 191h and the second subpixel electrode 191l, to which the data voltage is applied, generate an electric field together with the common electrode 270 to determine an orientation of the liquid crystal molecules 31 in the microcavity 305 between the two electrodes 191 and 270. Luminance of light which passes through the liquid crystal layer may vary depending on the orientation of the liquid crystal molecules 31, as determined as described above.

A roof layer 370 is located on the common electrode 270. The roof layer 370 may be formed of the organic material. The microcavity 305 is formed below the roof layer 370, and the roof layer 370 is hardened by a curing process to maintain the shape of the microcavity 305. The roof layer 370 is formed to be spaced from the pixel electrode 191 with the microcavity 305 therebetween.

The roof layer 370 is formed in each pixel area PX and in the partition portion V2 along the pixel row, and is not formed in a liquid crystal injection hole formation region V1. That is, the roof layer 370 is not formed between the first subpixel area PXa and the second subpixel area PXb. In each first subpixel area PXa and each second subpixel area PXb, the microcavity 305 is formed below each roof layer 370. In the partition portion V2, the microcavity 305 is not formed below the roof layer 370, the roof layer 370 is protruded downward to form the partition portion V2, and the partition portion V2 may define the microcavities 305 adjacent to each other in the row direction. Accordingly, the thickness of the roof layer 370 at the partition portion V2 may be thicker than the thickness of the roof layer 370 at the first subpixel area PXa and at the second subpixel area PXb. An upper surface and both sides of the microcavity 305 are formed to be covered by the roof layer 370.

An injection hole 307 exposing a part of the microcavity 305 is formed in the common electrode 270 and in the roof layer 370. The injection holes 307 may be formed to face each other at edges of the first subpixel area PXa and of the second subpixel area PXb. That is, the injection holes 307 may be formed such that they correspond to a lower side of the first subpixel area PXa, and to an upper side of the second subpixel area PXb, so as to expose lateral sides of the microcavity 305. Because the microcavity 305 is exposed by the injection hole 307, an aligning agent or a liquid crystal material may be injected into the microcavity 305 through the injection hole 307.

An overcoat 390 may be formed on the roof layer 370. The overcoat 390 covers the injection hole 307 in the liquid crystal injection hole formation region V1, to which the liquid crystal material and the alignment material are injected. That is, the overcoat 390 may seal the microcavity 305, such that the liquid crystal molecules 31 formed in the microcavity 305 are not able to be discharged outside. Since the overcoat 390 contacts the liquid crystal molecules 31, the overcoat 390 may be made of a material that is not reactive with the liquid crystal molecules 31.

The overcoat 390 may consist of a multilayer, such as a double layer and a triple layer. The double layer consists of two layers that are made of different materials. The triple layer consists of three layers, and materials of adjacent layers are different from each other. For example, the overcoat 390 may include a layer that is made of an organic insulating material, and a layer that is made of an inorganic insulating material.

In the display device according to an exemplary embodiment of the present invention, the light emission ratio is improved, and the color reproducibility is improved, thereby providing the display device having excellent display quality.

Figure 7:
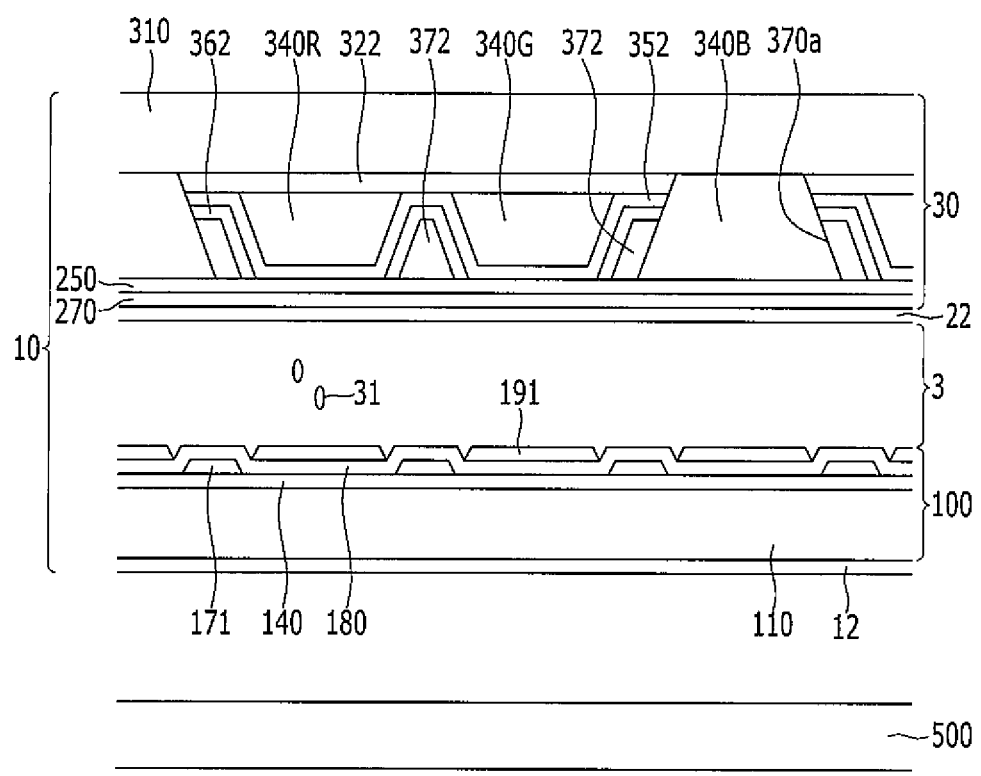
FIG. 7 is a cross-sectional view of a display device according to an exemplary embodiment of the present invention.

Next, the display device according to an exemplary embodiment of the present invention will be described with reference to FIG. 7. FIG. 7 is a cross-sectional view of a display device according to an exemplary embodiment of the present invention.

The display device according to the present embodiment includes the display panel 10 and the light assembly 500. The display panel 10 may be disposed on the light assembly 500, although the present invention is not limited thereto, and the relative up/down position may be changed in other embodiments.

The display panel 10 according to the present embodiment includes the thin film transistor array panel 100, the color conversion panel 30 facing and separated from the thin film transistor array panel 100, and the liquid crystal layer 3 between the thin film transistor array panel 100 and the color conversion panel 30, and including the liquid crystal molecules 31. That is, in the display panel 10 according to the present embodiment, in contrast to the above-described exemplary embodiment, the color conversion panel 30 forms the part of the display panel 10.

The display panel 10 may further include the first polarizer 12 at one surface of the thin film transistor array panel 100, and the second polarizer 22 at one surface of the color conversion panel 30.

The thin film transistor array panel 100 according to the present exemplary embodiment is the same as the lower panel 100 of FIG. 3 and FIG. 4, and the color conversion panel 30 is similar to the color conversion panel 30 of FIG. 1, such that it will be described with reference to FIG. 1, FIG. 3, and FIG. 4, as well as FIG. 7.

Firstly, the plurality of pixel electrodes are arranged in a matrix shape on the first insulation substrate 110 included in the thin film transistor array panel 100.

Referring to FIG. 3 and FIG. 7, on the first insulation substrate 110, there are the gate line 121 extending in the row direction and including the gate electrode 124, the gate insulating layer 140 on the gate line 121, the semiconductor layer 154 on the gate insulating layer 140, the data line 171 on the semiconductor layer 154, and extending in a column direction, and including the source electrode 173, the drain electrode 175, the passivation layer 180 on the data line 171 and the drain electrode 175, and the pixel electrode 191 electrically and physically connected to the drain electrode 175 through the contact hole 185.

The semiconductor layer 154 on the gate electrode 124 forms the channel layer in the region that is exposed by the source electrode 173 and the drain electrode 175, and the gate electrode 124, the semiconductor layer 154, the source electrode 173, and the drain electrode 175 form one thin film transistor.

Next, referring to FIG. 1 and FIG. 7, the blue light cutting filter 322 is on a surface of the insulation substrate 310 facing, and separated from, the first insulation substrate 110. The blue light cutting filter 322 may overlap a first color conversion media layer 340R and a second color conversion media layer 340G.

The blue light cutting filter 322 prevents color mixing from being generated in the process in which the blue light emitted from a light assembly 500 is realized as the red (R) and green (G) colors through the first color conversion media layer 340R and the second color conversion media layer 340G, respectively.

Next, a plurality of color conversion media layer 340R, 340G, and 340B are located on a surface of the insulation substrate 310 and on the blue light cutting filter 322 facing the thin film transistor array panel 100.

The first color conversion media layer 340R may convert the blue light supplied from the light assembly 500 into red light, and the second color conversion media layer 340G may convert the blue light supplied from the light assembly 500 into green light. For this, the first color conversion media layer 340R and the second color conversion media layer 340G may include one of the quantum dot or the phosphor.

The first color conversion media layer 340R and the second color conversion media layer 340G may be formed by exposing and developing a negative photosensitive resin, and the cross-section of the first color conversion media layer 340R and of the second color conversion media layer 340G has a tapered shape. The first color conversion media layer 340R and the second color conversion media layer 340G are insoluble.

The third color conversion media layer 340B is made of the transparent polymer, and the blue light supplied from the light assembly 500 is transmitted to represent the blue. The third color conversion media layer 340B corresponding to the region emitting the blue includes a material emitting the incident blue with the separate phosphor or quantum dot (as one example, the polymer such as the photosensitive resin).

In this case, the cross-section of the third color conversion media layer 340B may be inversely tapered, and the upper surface of the third color conversion media layer 340B may be slightly concave.

The third color conversion media layer 340B may be soluble. This is because the third color conversion media layer 340B may be formed by using the color conversion resin of the negative photosensitive resin without separate exposure and developing. That is, the color conversion resin does not include the boding forming from the exposure.

Next, the band-pass filter 352 is located on the first color conversion media layer 340R, on the second color conversion media layer 340G, and on the blue light cutting filter 322. The band-pass filter 352 and the blue light cutting filter 322 may be formed through the same process, and the flat shape thereof may be the same.

An assistance metal layer 362 is located on a surface of the band-pass filter 352 facing the thin film transistor array panel 100, and is disposed between the adjacent color conversion media layers 340R, 304G, and 340B. The assistance metal layer 362 may be a metal material reflecting the light, and again reflects the light emitted in the direction of the assistance metal layer 362 to the direction of the color conversion media layers 340R, 340G, and 340B, thereby increasing the light amount emitted to the user.

Next, the light blocking member 372 is located on a surface of the band-pass filter 352 facing the thin film transistor array panel 100, and is disposed at respective locations between the plurality of color conversion media layers 340R, 340G, and 340B.

As shown in FIG. 7, the light blocking member 372 defines the regions where the first color conversion media layer 340R, the second color conversion media layer 340G, and the third color conversion media layer 340B are disposed.

The light blocking member 372 may be formed by exposing and developing the negative light blocking photosensitive resin, and the light blocking member 372 formed by using the exposed light blocking photosensitive resin is insoluble.

Next, the planarization layer 250 providing the flat surface may be disposed on a surface of the light blocking member 372 and on the band-pass filter 352 facing the thin film transistor array panel 100, and the common electrode 270 may be located on a surface of the planarization layer 250 facing the thin film transistor array panel 100. According to other embodiments, the planarization layer 250 may be omitted.

The common electrode 270 receiving the common voltage forms the electric field with the pixel electrode 191, and thereby arranges liquid crystal molecules 31 in the liquid crystal layer 3.

The liquid crystal layer 3 includes the plurality of liquid crystal molecules 31, and the arrangement direction of the liquid crystal molecules 31 is controlled by the electric field between the pixel electrode 191 and the common electrode 270. According to arrangement of the liquid crystal molecules 31, transmittance of light received from the light assembly 500 may be controlled to display the image.

The above-described display device according to an exemplary embodiment of the present invention does not includes the upper panel 200 shown in FIG. 4, and the color conversion panel 30 replaces the function of the upper panel. This display device of the present embodiment is a relatively thinner device, and the cost and the weight thereof may be reduced.

Next, the manufacturing process of the color conversion panel according to an exemplary embodiment of the present invention will be described with reference to FIGS. 8-12. FIG. 8, FIG. 9, FIG. 10, FIG. 11, and FIG. 12 are cross-sectional views of a color conversion panel according to a manufacturing process.

Figure 8:
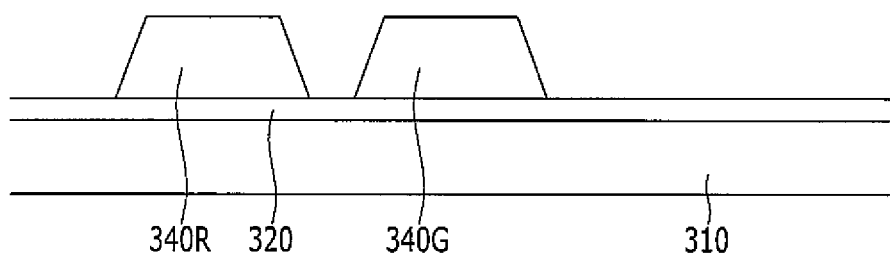
FIG. 8, FIG. 9, FIG. 10, FIG. 11, and FIG. 12 are cross-sectional views of a color conversion panel according to a manufacturing process.

Firstly, as shown in FIG. 8, a blue light cutting material layer 320 is formed in an entirety of the insulation substrate 310.

Next, a first color conversion media layer 340R disposed on the insulation substrate 310 is formed by using a first mask, and a second color conversion media layer 340G disposed on the insulation substrate 310 is formed by using a second mask.

Figure 9:
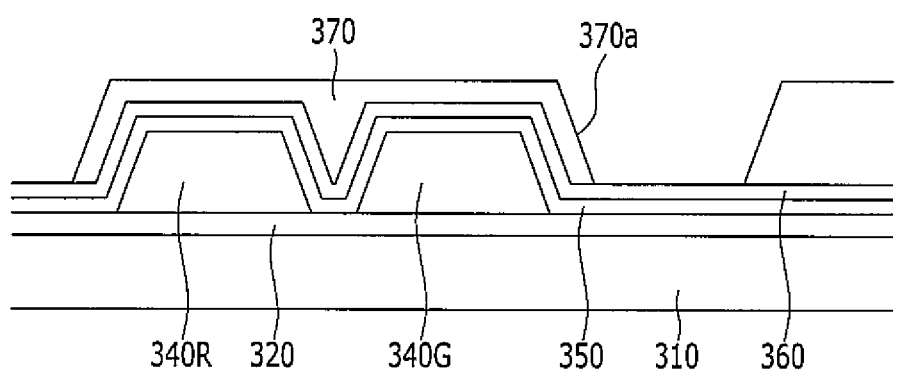

Next, as shown in FIG. 9, a band-pass material layer 350 and a metal material layer 360 are sequentially deposited on the blue light cutting material layer 320, on the first color conversion media layer 340R, and on the second color conversion media layer 340G. In other embodiments, at least one of the band-pass material layer 350 and the metal material layer 360 may be omitted.

Next, a light blocking photosensitive resin is coated on the metal material layer 360, and the coated light blocking photosensitive resin is patterned by using a third mask. The patterned light blocking photosensitive resin 370 includes the opening 370a overlapping the metal material layer 360, and later filled with the third color conversion media layer 340B.

Figure 10:
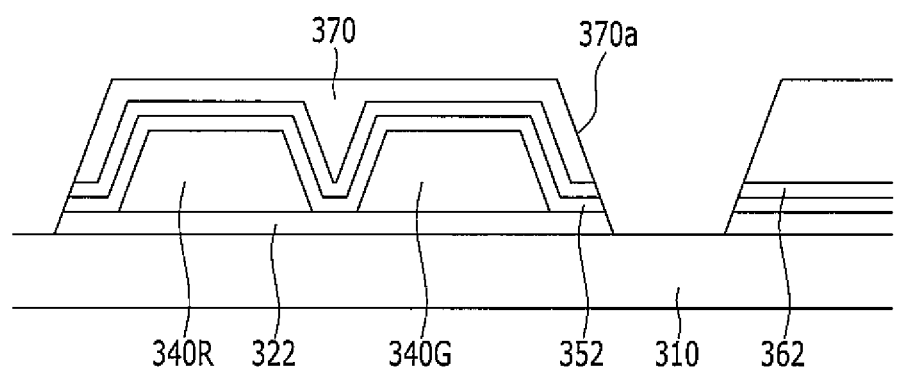

Next, referring to FIG. 10, the metal material layer 360, the band-pass material layer 350, and the blue light cutting material layer 320 are etched by using the patterned light blocking photosensitive resin 370 as a mask. In this case, the region exposed by the opening 370a is from in the metal material layer 360, from the band-pass material layer 350, and from the blue light cutting material layer 320, thereby forming the assistance metal layer 362, the band-pass filter 352, and the blue light cutting filter 322, respectively.

Figure 11:
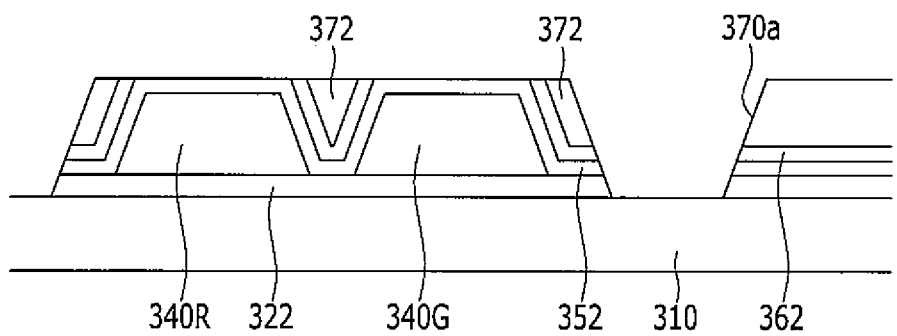

Next, as shown in FIG. 11, the patterned light blocking photosensitive resin is ashed. Particularly, the ashing is performed to expose the assistance metal layer 362 or the band-pass filter 352 such that the light blocking member 372 is finally formed.

Figure 12:
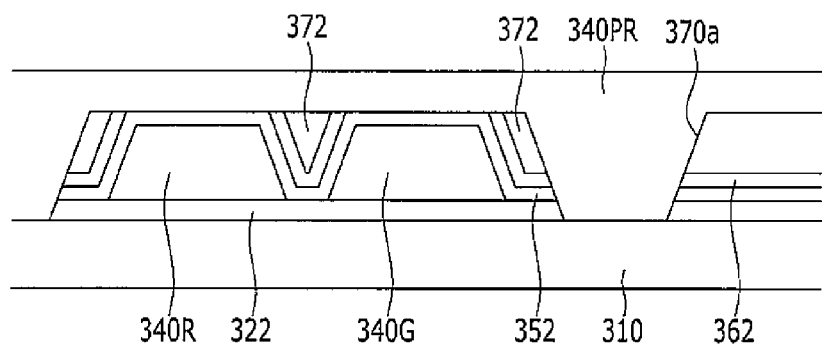

Next, as shown in FIG. 12, a color conversion resin 340PR is thickly coated on the light blocking member 372 and on the insulation substrate 310.

If the coated color conversion resin 340PR is ashed until the band-pass filter 352 is exposed, the third color conversion media layer 340B in the opening 370a is formed. As described above, the formed color conversion panel 30 is the same as the color conversion panel 30 shown in FIG. 1.

On the other hand, the method of forming the third color conversion media layer 340B is not limited to the manufacturing method of FIG. 12, and a method of performing the exposure on the rear surface of the insulation substrate 310 may be possible.

Referring to FIG. 12, after equally performing the manufacturing processes of FIGS. 8 to 11, a color conversion resin 340PR is thickly coated on the light blocking member 372 and the insulation substrate 310. Next, if the exposure is performed at the rear surface of the insulation substrate 310, and if the color conversion resin 340PR is developed, the manufacturing of the color conversion panel 30 shown in FIG. 1 is possible.

In detail, when irradiating ultraviolet rays at the rear surface of the insulation substrate 310, the blue light cutting filter 322 overlapping the first and second color conversion media layers 340R and 340G block the irradiated ultraviolet rays. That is, the color conversion resin 340PR overlapping the first and second color conversion media layers 340R and 340G maintains solubility. In contrast, the color conversion resin 340PR posited at the opening 370a in which the blue light cutting filter 322 is not disposed becomes insoluble due to the exposure process.

Accordingly, if the developing process is performed for the color conversion resin 340PR exposed with the rear surface exposure, the color conversion resin, with the exception of the color conversion resin at the opening 370a, is removed. Accordingly, the third color conversion media layer 340B at the opening 370a may be formed.

The above-described manufacturing process of the color conversion panel may use three masks to form the color conversion panel, such that the manufacturing process is simplified, thereby reducing the cost and the time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A color conversion panel comprising:
an insulation substrate;
a plurality of color conversion media layers on the insulation substrate and configured to emit different lights; and
a light blocking member between adjacent ones of the color conversion media layers,
wherein a cross-section of one of the color conversion media layers is inversely tapered when compared to a cross section of another one of the color conversion media layers, and
wherein the inversely tapered color conversion media layer comprises an unexposed negative photosensitive resin and the other one of the plurality of color conversion media layers comprises an exposed photosensitive resin.

2. The color conversion panel of claim 1, wherein the other one of the color conversion media layers comprises a negative photosensitive resin, and
wherein the inversely tapered color conversion media layer is soluble.

3. The color conversion panel of claim 2, wherein the plurality of color conversion media layers comprises a first color conversion media layer, a second color conversion media layer, and a third color conversion media layer,
wherein the first color conversion media layer and the second color conversion media layer comprise a quantum dot or a phosphor, and
wherein the third color conversion media layer does not include a quantum dot or a phosphor.

4. The color conversion panel of claim 2, wherein the plurality of color conversion media layers comprises a first color conversion media layer and a second color conversion media layer, the color conversion panel further comprising:
a blue light cutting filter on the insulation substrate and overlapping the first color conversion media layer and the second color conversion media layer, the blue light cutting filter being continuously formed.

5. The color conversion panel of claim 4, further comprising a band-pass filter on the first color conversion media layer and on the second color conversion media layer.

6. The color conversion panel of claim 5, further comprising an assistance metal layer between adjacent ones of the color conversion media layers.

7. The color conversion panel of claim 6, wherein the light blocking member overlaps the assistance metal layer, the band-pass filter, or the blue light cutting filter.

8. A display device comprising:
a display panel; and
a color conversion panel on the display panel and comprising:
an insulation substrate;
a plurality of color conversion media layers on the insulation substrate, facing the display panel, and configured to emit different lights; and
a light blocking member between adjacent ones of the color conversion media layers,
wherein a cross-section of one of the color conversion media layers is inversely tapered when compared to a cross-section of another one of the color conversion media layers, and
wherein the inversely tapered color conversion media layer comprises an unexposed negative photosensitive resin and the other one of the plurality of color conversion media layers comprises an exposed photosensitive resin.

9. The display device of claim 8, wherein the other one of the color conversion media layers comprises a negative photosensitive resin, and
wherein the inversely tapered color conversion media layer is soluble.

10. The display device of claim 8, wherein the plurality of color conversion media layers comprises a first color conversion media layer, a second color conversion media layer, and a third color conversion media layer,
wherein the first color conversion media layer and the second color conversion media layer comprise a quantum dot or a phosphor, and
wherein the third color conversion media layer does not comprise a quantum dot or a phosphor.

11. A display device comprising:
a thin film transistor array panel;
a color conversion panel facing the thin film transistor array panel; and
a liquid crystal layer comprising liquid crystal molecules and contacting the thin film transistor array panel and the color conversion panel,
wherein the color conversion panel comprises:
an insulation substrate;
a plurality of color conversion media layers on the insulation substrate, facing the thin film transistor array panel, and configured to emit lights of different colors; and
a light blocking member between adjacent ones of the color conversion media layers, and
wherein a cross-section of one of the color conversion media layers is inversely tapered when compared to a cross-section of another one of the color conversion media layers.

12. The display device of claim 11, wherein the other one of the color conversion media layers comprises a negative photosensitive resin, and
wherein the inversely tapered color conversion media layer is soluble.

13. The display device of claim 11, wherein the plurality of color conversion media layers comprises a first color conversion media layer, a second color conversion media layer, and a third color conversion media layer,
wherein the first color conversion media layer and the second color conversion media layer comprise a quantum dot or a phosphor, and
wherein the third color conversion media layer does not comprise a quantum dot or a phosphor.

14. A method for manufacturing a color conversion panel, the method comprising:

forming a first color conversion media layer on an insulation substrate with a mask;
forming a second color conversion media layer on the insulation substrate with a mask;
forming a light blocking member on the first color conversion media layer or the second color conversion media layer, the light blocking member defining an opening;
coating a color conversion resin on the light blocking member; and
ashing the color conversion resin without exposure to form a third color conversion media layer in the opening, and
wherein a cross-section of the third color conversion media layers is inversely tapered when compared to a cross-section of the first and second color conversion media layers.

15. The method of claim 14, wherein the color conversion resin comprises a negative photosensitive resin,
wherein the first color conversion media layer and the second color conversion media layer are insoluble, and
wherein the third color conversion media layer is soluble.

16. The method of claim 14, further comprising:
forming a blue light cutting material layer on the insulation substrate;
forming a band-pass material layer on the first color conversion media layer and on the second color conversion media layer; and
forming a metal material layer on the band-pass material layer.

17. The method of claim 16, further comprising etching the blue light cutting material layer, the band-pass material layer, or the metal material layer by using the light blocking member as a mask to form a blue light cutting filter, a band-pass filter, or an assistance metal layer.

18. The method of claim 14, wherein the forming of the light blocking member comprises:
coating a light blocking photosensitive resin on the first color conversion media layer and on the second color conversion media layer;
patterning the coated light blocking photosensitive resin; and
ashing the patterned light blocking photosensitive resin.

* * * * *